United States Patent
Prucnal et al.

(12) 
(10) Patent No.: US 6,448,913 B1
(45) Date of Patent: Sep. 10, 2002

(54) TOAD- BASED OPTICAL DATA FORMAT CONVERTER

(75) Inventors: Paul R. Prucnal; Ivan Glesk, both of Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 09/612,422

(22) Filed: Jul. 7, 2000

Related U.S. Application Data

(60) Provisional application No. 60/142,890, filed on Jul. 8, 1999.

(51) Int. Cl.[7] .............................................. H03M 1/00
(52) U.S. Cl. ....................................... 341/137; 341/155
(58) Field of Search ................... 341/137, 155, 341/68, 69; 359/123, 279

(56) References Cited

U.S. PATENT DOCUMENTS

| | | | |
|---|---|---|---|
| 5,493,433 A | 2/1996 | Prucnal et al. | 359/123 |
| 5,535,001 A | 7/1996 | Tajima | 356/345 |
| 5,625,722 A | * 4/1997 | Froberg et al. | 385/1 |
| 5,625,727 A | 4/1997 | Liedenbaum et al. | 385/16 |
| 5,825,519 A | 10/1998 | Prucnal | 359/127 |
| 5,953,138 A | 9/1999 | Ellis | 359/123 |
| 5,999,293 A | 12/1999 | Manning | 359/139 |
| 6,097,529 A | 8/2000 | Lee et al. | 359/279 |
| 6,208,455 B1 | 3/2001 | Ueno et al. | 359/332 |
| 6,226,090 B1 | * 5/2001 | Yoneyama | 356/450 |
| 6,265,999 B1 | * 7/2001 | Prucnal | 341/137 |
| 6,282,015 B1 | 8/2001 | Ueno et al. | 359/332 |

OTHER PUBLICATIONS

Eiselt et al.,*Journal of Lightwave Technology*, vol. 13, No. 10, Oct. 1995, "SLALOM: Semiconductor Laser Amplifier in a Loop Mirror," pp. 2099–2112.

Kang et al., *International Journal of High Speed Electronics and Systems*, vol. 7, No. 1 (1996), "Ultrafast Optical Time Demultiplexers Using Semiconductor Optical Amplifiers," pp. 125–151.

Patent Abstract of Japan, Japanese Publication No. 10-319448, Dec. 4, 1998.

G. Raybon et al.; 20 Gbit/s All–Optical Regeneration and Wavelength Conversion Using SOA Based Interferometers; OFC/IOOC '99, pp. 27–29, vol. 4.

* cited by examiner

*Primary Examiner*—Peguy JeanPierre
(74) *Attorney, Agent, or Firm*—Pennie & Edmonds LLP

(57) ABSTRACT

An optical data format converter and method using a Terahertz Optical Asymmetric Demultiplexer (TOAD) to increase or decrease the duty cycle of an optical signal. To increase the duty cycle, such as converting RZ pulses to NRZ format, the optical data is injected at the clock input port of the TOAD and a continuous wave (CW) laser feeds the data input port. A stretched copy of the input signal will appear at the output port of the TOAD, with the output pulse width determined by the TOAD sampling window. To decrease the duty cycle, the optical data is injected at the data input port of the TOAD and a pulsed control signal is injected at the clock input port. The switching window is selected to be smaller than that period of the NRZ signal causing only the portion of the NRZ signal that overlaps the window to appear at the output of the TOAD.

37 Claims, 2 Drawing Sheets

Sagnac TOAD format converter

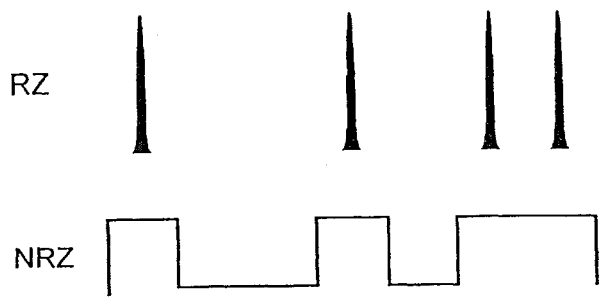
Figure 1. Conversion of optical data from RZ to NRZ
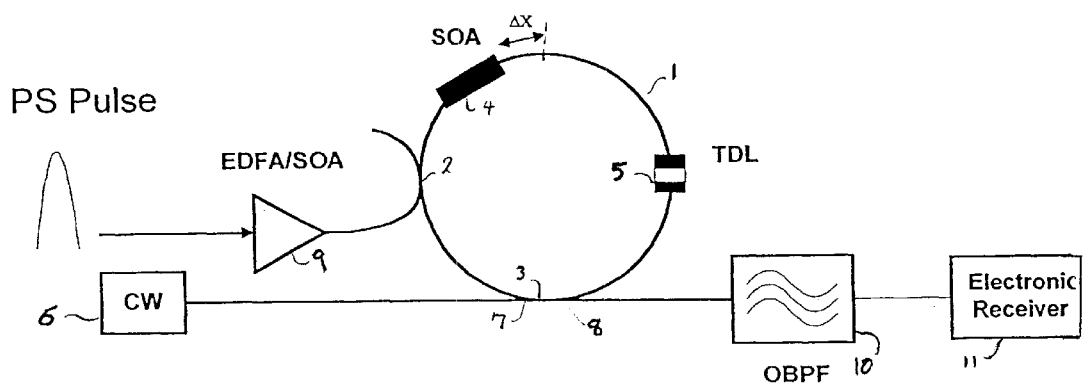
Figure 2. Sagnac TOAD format converter
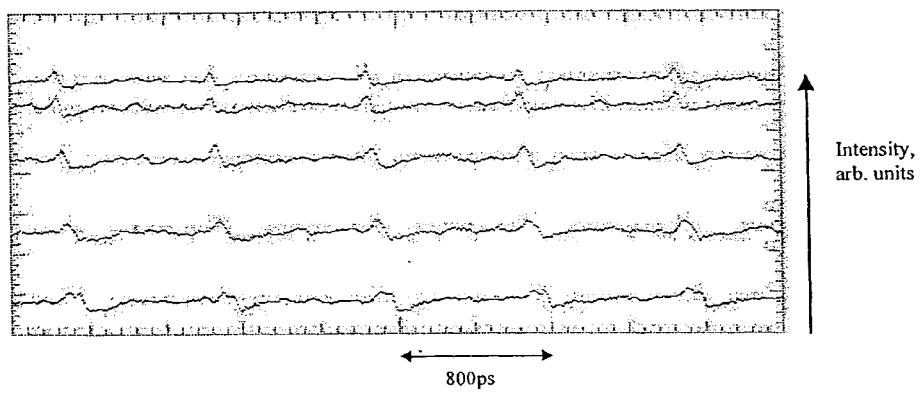
Figure 3 Experimental data showing pulse stretching

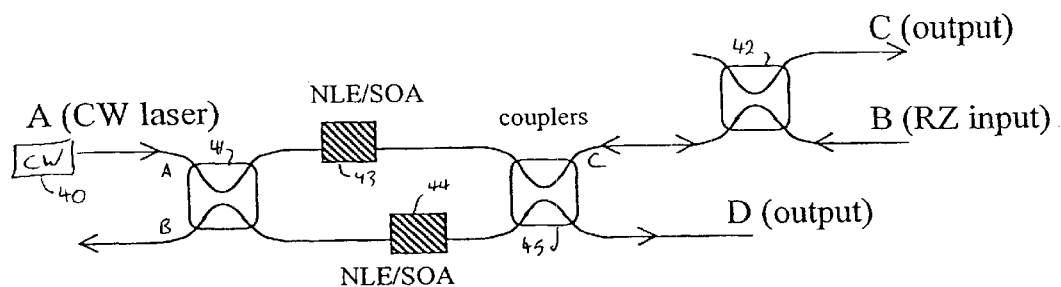
Figure 4. Mach Zehnder TOAD format converter
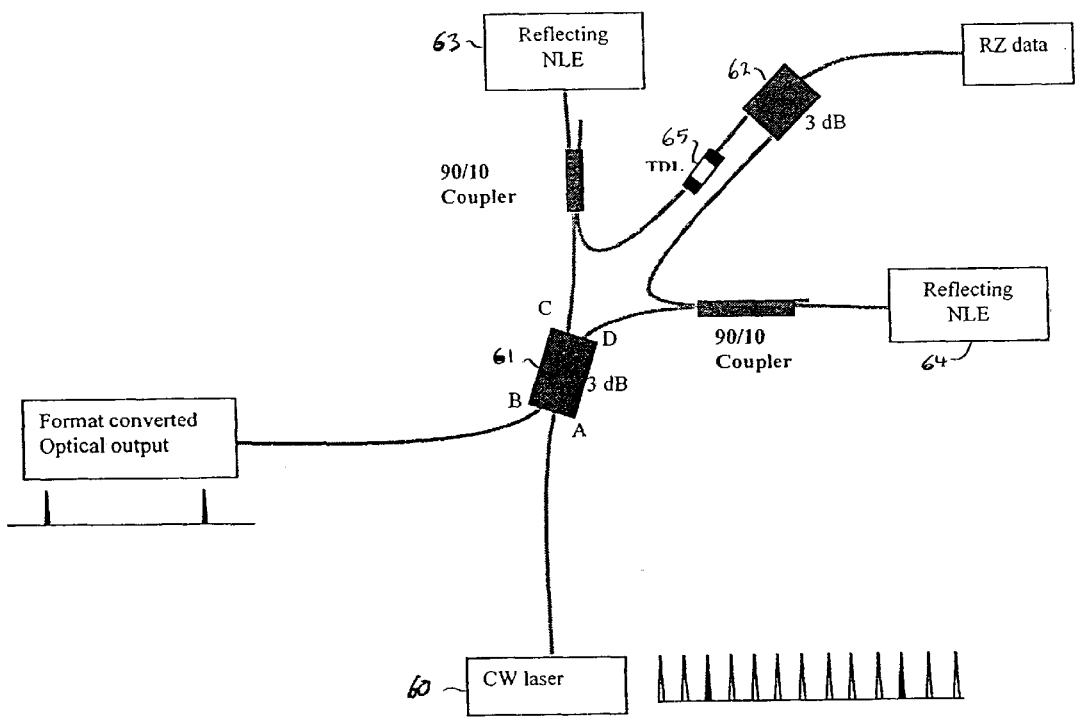
Figure 5. Michelson TOAD format converter

TOAD-BASED OPTICAL DATA FORMAT CONVERTER

This application claims the benefit under 35 U.S.C. 119 of U.S. Provisional Application No. 60/142,890 filed Jul. 8, 1999.

FIELD OF THE INVENTION

The present invention relates generally to an optical data format converter that converts non-return-to-zero (NRZ) optical signals to return-to-zero (RZ) optical signals and vice versa.

BACKGROUND

Two types of optical data format are typically used in optical communications systems: (1) non-return-to-zero (NRZ) format and (2) return-to-zero (RZ) format. In NRZ format, a '1' bit in an optical data stream is encoded as an optical data signal present for substantially all of a period of the signal, where a period is an arbitrary length of time allocated to each bit in the data stream. In RZ format, a '1' bit is encoded as a small width pulse within the period of the signal (i.e., the optical signal goes to '1' and then returns to '0'). It may be desirable to use different formats within a single optical system or in communicating optical systems and therefore a method for converting one format to another is needed.

For example, the NRZ data format has typically been the industry choice for wavelength division multiplexing (WDM) and dense wavelength division multiplexing (DWDM) because: (1) it requires lower bandwidth in the electronic states of the receiver; (2) it has a high tolerance to timing jitter; and (3) stable continuous wave (CW) distributed feedback (DFB) lasers and high-quality LiNbO$_3$ modulators needed for NRZ data format are readily commercially available. More than 100 wavelengths can be concurrently transmitted between nodes of an optical network using NRZ data format in a WDM system. However, due to a much longer cross-wavelength interaction time, compared to RZ format, nonlinear distortions produced by self-phasing modulation, cross phase modulation, four wave mixing, and stimulated Raman and Baillouin scattering (SRS and SBS) introduce tremendous challenges to these systems. Also, NRZ formatted data requires under-compensation, a technique used to pre-shape pulses to compensate for pulse spreading due to linear chromatic dispersion. The degree of under-compensation depends on signal power, transmission distances and amplifier spacing.

When fewer channels are implemented in a WDM network system, RZ data format increases the individual channel bit rate. The RZ formatted data pulses: (1) suppress SBS significantly because of much wider spectrum (i.e., because the wavelengths of the channels are not typically packed as close together as NRZ formatted data); (2) introduce less nonlinear distortions due to reduced crossing wavelength interaction time; (3) have better receiver sensitivity (i.e., weaker signals can be accurately detected for RZ data compared to NRZ data); (4) have fewer dependencies on signal launching power and transmission distance for dispersion compensation; and (5) can be used for soliton communications. RZ format has proven to be superior to NRZ format especially at bit rates of 10 to 20 Gb/s or even 40 Gb/s per channel. Therefore, in newly designed and installed network systems where dispersion is well managed, RZ data format becomes more attractive. On the other hand, for fiber systems installed in the 1970's and 1980's, NRZ format is usually a better choice; most fiber systems installed at that time are single mode fiber that causes no dispersion near 1.3 microns, a wavelength commonly used for NRZ data. Dispersion is not however compensated well in these fiber systems near 1.5 microns, a wavelength commonly used for RZ data. In cases where dispersion induced distortions dominate, NRZ format is a better choice.

RZ data format is also the format of choice for Optical Time Division Multiplexed (OTDM) systems, which bit interleave very short (e.g., picosecond) RZ pulses. OTDM is often used in high speed LAN and computer interconnects.

Selection of a particular format depends on specific parameters in transmission links or network systems. For example, for WDM, an optimal pulse width or data format exists for a specific overall dispersion, launch power, wavelength spacing bit rate, etc. A device that could adjust the pulse width of an optical signal would be a powerful tool to balance design trade-offs; for example, such a device could (1) convert NRZ format signals used in one part of a WDM network to RZ format used in another part of the network, (2) interface a long haul soliton transmission system with an existing NRZ transmission system, (3) interface an OTDM LAN to a DWDM network. Additionally, such a device could improve interoperability by maintaining optical transparency.

SUMMARY OF INVENTION

It is therefore an object of the present invention to provide a device and method for converting RZ optical pulses to NRZ format.

It is a further object of the present invention to provide a device and method for converting NRZ optical pulses to RZ format.

It is yet another object of the present invention to provide a device and method for lengthening and compressing the pulse width of an optical signal.

It is still another object of the present invention to provide a device for converting the wavelength of an optical signal to a different wavelength.

Briefly, an optical data format converter in accordance with the present invention uses a Terahertz Optical Asymmetric Demultiplexer (TOAD) to increase or decrease the duty cycle of an optical signal. In an embodiment that increases the duty cycle, such as converting RZ pulses to NRZ format, the optical data is injected at the clock input port of the TOAD and a continuous wave (CW) laser feeds the data input port. A stretched copy of the input signal will appear at the output port of the TOAD, with the output pulse width determined by the TOAD sampling, or switching, window. Also, if the input signal is at a different frequency than the CW laser, then by using a narrow linewidth CW laser at the TOAD's data input port and placing a narrow band optical filter at the output, the format converter can also reduce the amount of noise in the input signal and transmit a cleaner signal to a receiver. In this case, the converter will also act as a wavelength converter, converting the wavelength of the input data signal to the wavelength of the CW laser. An input RZ signal and an output NRZ signal is illustrated in FIG. 1 (i.e., the format converter can increased the RZ signal duty cycle to about 100% such that data format is converted to NRZ).

In an embodiment that decreases the duty cycle, such as converting NRZ pulses to RZ format, the optical data is injected at the data input port of the TOAD and a pulsed control signal is injected at the clock input port. The sampling window is selected to be smaller than that period of the NRZ signal. Only the portion of the NRZ signal that overlaps the window appears at the output of the TOAD and thus the duty cycle is decreased.

Various implementations of the TOAD exist, such as the Sagnac TOAD, the Mach-Zehnder TOAD, and the Michelson TOAD. Each of the various TOAD implementations can be used in a format converter in accordance with the present invention and invention is intended to embrace all TOAD implementations.

BRIEF DESCRIPTION OF THE DRAWINGS

FIG. 1 illustrates the conversion of optical data from RZ format to NRZ format.

FIG. 2 depicts a data converter in accordance with an embodiment of the present invention.

FIG. 3 shows experimental results obtained from an embodiment of the present invention.

FIG. 4 depicts another embodiment of the present invention.

FIG. 5 depicts yet another embodiment of the present invention.

DETAILED DESCRIPTION

FIG. 2 illustrates a format converter in accordance with an embodiment of the present invention. Sagnac TOAD 1 comprises a first coupler 2, a second coupler 3 and an optical amplifier (SOA) 4 and further includes a tunable delay line (TDL) 5. All the elements are optically connected as shown. SOA 4, which is a type of non-linear element (NLE), is offset $\Delta x$ from the mid point of the loop, relative to second coupler 3. SOA 4 may be, for example, a semiconductor optical amplifier or any other suitable type of NLE.

The structure and operation of a Sagnac TOAD is described in U.S. Pat. No. 5,493,433, which is incorporated herein by reference. Briefly, a Sagnac TOAD is an optical loop having first and second terminals and a mid point. An NLE is positioned in the loop at a distance $\Delta x$ from the mid point. A first coupler is positioned in the loop and has a clock or control pulse applied to it at a clock/control port which causes a change in the optical property of the NLE from a first state to a second state. In its first state, the NLE has substantially no effect on light passing through it; in its second state the NLE causes a phase change in light passing through it. The change in NLE state may occur, for example, due to saturation of the NLE by the clock pulse. A second coupler is optically coupled to the first and second terminals and has a data input port for receiving a series of input optical pulses and output port for outputting optical pulses. The second coupler produces, for each input pulse, a pair of counter-propagating pulses in the optical loop. Control circuitry typically causes a clock pulse to be applied to the optical loop such that the NLE is switched from its first state to its second state after one of the pair of counter-propagating pulses has passed through the NLE, but before the other counter-propagating pulse has reached the NLE. In this manner, one counterpropagating pulse is affected by the second state of the NLE and the other counterpropagating pulse is not, thereby enabling a differential signal to exit from the output port of the second coupler to a detector.

As used herein, a TOAD is an optical device having a data signal input port, a control signal input port, one or more non-linear elements, each having a first state in which light passing through it is substantially unchanged and a second state in which a characteristic of the light passing through it is changed, and an output port. The data input port, the control input port and the output port are coupled to at least one of the one or more non-linear elements such that at least two optical paths are formed from the data input port to the output port each including a non-linear element. A control signal input at the control input port causes the non-linear element in each path to change from its first state to its second state. An optical data signal input to the data input port will produce an output data signal on the output port if light on the two optical paths arrives at the output port having passed through different non-linear element states. The optical paths may include the same non-linear element or elements or different elements. If the light signals on the two optical paths do not pass through different non-linear element states, substantially no output data signal is produced on the output port.

In a data converter in accordance with one embodiment of the present invention, input RZ data is injected at first coupler 2 and a continuous light source, such as narrow linewidth CW laser 6, is applied at input 7 of second coupler 3. Injection of RZ data into first coupler 2 changes the state of NLE 4. After the RZ data changes the state of NLE 4, the two counterpropagating light waves experience two different NLE states for a sampling, or switching, window of time duration $2\Delta x/v$, where v is the speed of light in the medium which constitutes the optical loop. This results in an optical pulse having a duration of $2\Delta x/v$ exiting from output port 8 of second coupler 3. The magnitude of the differential output signal depends on both the amplitude and phase difference between the returning counterpropagating continuous light waves. Alternatively, the continuous light source can be a continuous sequence of light pulses having a pulse width greater than the sampling window. In this case, the continuous light source pulses must be properly timed with the pulses in the RZ data signal.

In one embodiment, optical amplifier 9 is placed before the first coupler to increase the power of the input RZ pulses, resulting in a greater difference between the two states of SOA 4. Optical amplifier 9 may be, for example, an erbium doped fiber amplifier, a semiconductor optical amplifier, or any other suitable amplifier. The amplified RZ pulses are preferably coupled into the loop through a 90/10 coupler. CW source 6 is preferably a narrow linewidth tunable semiconductor laser.

Inside the loop, Tunable Delay Line (TDL) 5 allows tuning of $\Delta x$ and therefore tuning of the temporal extent, i.e. length, of the output pulses. TDL 5 thus not only allows the conversion of narrow RZ pulse to NRZ signal, but also allows the format converter to assign an arbitrary duty cycle to the input RZ pulse.

Optical band pass filter (OBPF) 10 placed at the output of second coupler 3 serves to reduce the amount of noise entering electronic receiver 11 and to reject the input RZ data pulses if the RZ signal and the CW laser are different wavelengths. Since both CW laser 6 and OBPF 10 preferably have narrow bandwidth relative to the RZ signal, noise can be significantly reduced through the optical filter. A format converter in accordance with an embodiment of the present invention can thus be used as a wavelength converter, wherein the input RZ signal is converted to an output signal having the wavelength of CW laser 6. Furthermore, the length of the output pulses can be set equal the length of the input pulses, so that the format converter acts solely as a wavelength converter, converting the input RZ pulses to output RZ pulses having a different wavelength.

The input RZ pulse can also be removed in other ways, including, but not limited to, using polarizers at the inputs of both the first and second couplers and placing a polarization splitter in place of OBPF 10.

In one implementation of a format converter in accordance with the present invention, input RZ pulses are generated by a fiber laser generating a 2.5 GHz modelocked pulse train, with 2 picosecond pulses, which is fed into a Lithium Niobate modulator. The modulated output is then amplified by an erbium doped fiber amplifier, optical amplifier 9, and injected into first coupler 2 of the format converter. Electronic receiver 11 is a bandwidth-limited photodetector that reads the output from the format converter and translates the optical signal into electrical signals, which is then sent into a digital oscilloscope, not shown.

FIG. 3 shows the oscilloscope display of the format converter output for five different values of $\Delta x$, with the pulse width increasing from the top waveform to the bottom. The value of $\Delta x$ was changed to different values by adjusting TDL 5. The RZ input was modulated by a 10101010 pattern, resulting in pulses that are 800 picoseconds apart (i.e., a 2.5 GHz modelocked pulse train has a period of 400 picoseconds and only alternate pulses are present). The widest pulses shown in FIG. 3, represented by the bottom waveform, have a width of approximately 100 picoseconds, corresponding to a 25 percent duty cycle. The range of the TDL 5 used in this implementation limited further increase of the pulse width, though the invention is not limited to a specific range. The results shown in FIG. 3 demonstrate that the TOAD format converter in accordance with the present invention can indeed take a series of vary narrow pulses and output the input optical data pattern with significantly increased pulse width. Bit error rates (BERs) lower than $10^{11}$ can be obtained by varying the average power of the input data pulses and CW input.

The FIG. 2 optical format converter can also convert an NRZ data stream to an RZ data stream. In this case, the NRZ data stream is input to second coupler 3 and a pulsed control signal (having, e.g., 1.3 picosecond pulses) is injected into first coupler 2. Each control pulse saturates SOA 4. If there is a data signal at the input port, such as a '1' in the NRZ stream, a control pulse will open a small sampling window and switch out only the portion of the NRZ '1' signal that overlaps the sampling window. The width of the window is again determined by the displacement of SOA 4 from the center of the loop. As long as the picosecond pulse train is aligned temporally with the NRZ data stream, the NRZ signal can be imprinted into RZ pulses at the output. Preferably, the control pulses are synchronized with the data stream in such a way that the sampling occurs near the center of the NRZ bit The width of the RZ data pulses can be adjusted by changing the setting of TDL 5. Temporal alignment between control pulses and the NRZ data stream, such that the sampling occurs near the center of the NRZ bit, can be achieved by adding appropriate delay either in the control optical path or the NRZ data stream. Alignment may be achieved, for example, by placing the center of the sampling window in a period excluding [T−τ,T+τ], where T is the boundary of a bit period of the NRZ data signal, and τ is the greater of the width of the sampling window and the rise and fall time of the NRZ data signal. For example, for τ=10 picoseconds and an NRZ bit rate of OC-48 (approx. 2.5 Gbits/s), corresponding to a period of 400 picoseconds, the alignment time range is 380 picoseconds. Even for NRZ bit rates of OC-192 (approx. 10 Gbits/s), with the same τ, the alignment time range is about 80 picoseconds, which corresponds to a fiber length accuracy of about ±8 millimeters.

The present invention can also be used to convert the wavelength of an input NRZ signal to another wavelength. In this case, the output of the NRZ to RZ format converter is applied to an RZ to NRZ converter in accordance with the present invention, such as the one described above. The output of the RZ to NRZ converter will have the wavelength of the input CW laser. The length of the output NRZ pulses can also be set to equal the length of the NRZ pulses input to the NRZ to RZ converter, thus causing the sequence of converters to act solely as a wavelength converter.

As previously mentioned, other versions of the TOAD, such as the Mach-Zehnder TOAD and the Michelson TOAD, can also perform as a format converter in accordance with the present invention. A description of duty cycle expansion using alternative TOADs is provided below. Duty cycle compression can also be performed in a manner similar to that explained above for the Sagnac TOAD embodiment.

FIG. 4 illustrates a format converter in accordance with an embodiment of the present invention that uses a Mach-Zehnder TOAD instead of a Sagnac TOAD. The structure and operation of a Mach-Zehnder TOAD is described in U.S. Pat. No. 5,825,519, which is incorporated herein by reference. In this embodiment, CW laser 40 is injected into a Mach-Zehnder TOAD at port A of coupler 41. The optical RZ data is injected at port B of coupler 42. Similarly to the Sagnac TOAD embodiment, the different arrival times at the two NLEs 43 and 45 by the clock pulse (here, an optical RZ data pulse) causes a duration of the CW light to see different NLE states and an optical pulse will exit at either port C or port D of coupler 45, with the exit port predetermined by the interference condition of the two optical paths in the Mach-Zehnder TOAD.

FIG. 5 illustrates a format converter in accordance with an embodiment of the present invention using a Michelson TOAD. The structure and operation of a Michelson TOAD is described in U.S. Provisional Patent Application No. 60/142,892, which is incorporated herein by reference. In this embodiment, CW laser 60 is injected into port A of coupler 61. The optical RZ data is injected into coupler 62. The optical paths from coupler 61 to reflecting NLEs 63 and 64 (specifically, from port C of coupler 61 to NLE 63 and from port D of coupler 61 to NLE 64) may be equal. The difference in the RZ data's arrival time at the two NLEs determines the width of the optical output at port B of coupler 61. This difference in arrival time can be tuned by adjusting TDL 65 in the Michelson TOAD.

Both the Mach-Zehnder TOAD and the Michelson TOAD can fully function as format converters in accordance with the present invention. In all the aforementioned embodiments of the TOAD format converter in accordance with the present invention, the ability to change optical data format from RZ to NRZ and from NRZ to RZ, as well as the ability to assign arbitrary duty cycles to the RZ format, allows the format converter to optimize an RZ or NRZ signal for input into various receivers and subsystems, and function as an important component in gateways between different optical networks.

It should be understood that the embodiments described herein are merely illustrative and not intended to limit the scope of the invention. One skilled in the art may make various changes, rearrangements and modifications without substantially departing from the principles of the invention, which is limited only in accordance with the claims.

What is claimed is:

1. An optical data format converter comprising:
   a TOAD having
      a data signal input port, a control signal input port,
one or more non-linear elements each having a first state in which light passing through it is substantially unchanged and a second state in which a characteristic of the light passing through it is changed, and an output port, and
a continuous optical signal source supplying a continuous optical signal to the data signal input port,
wherein if a data signal is input to the control signal input port, an output data signal is produced on the output port having a predetermined pulse width.

2. The converter of claim 1 wherein the data input port, the control input port and the output port are coupled to at least one of the one or more non-linear elements such that
at least two optical paths are formed from the data input port to the output port each including a non-linear element,
a control signal input at the control input port causes the non-linear element in each path to change from its first state to its second state, and
an optical data signal input to the data input port will produce an output data signal on the output port if an associated control signal is input to the control port and will otherwise produce substantially no output data signal on the output port, and
wherein,
the output data signal has a predetermined width based on the period of time that light from the two optical paths arrives at the output port having passed through different non-linear element states.

3. The converter of claim 2 further comprising:
a tunable delay line located in one of the first and second optical paths that adjusts the width of the data output signal.

4. The converter of claim 2 wherein the data signal input port, the output port and one of the non-linear elements form an optical loop.

5. The converter of claim 2 wherein
the data signal input port, a first non-linear element, and the output port form one of the at least two optical paths and the data signal input port, a second non-linear element, and the output port form another of the at least two optical paths.

6. The converter of claim 5 wherein the control signal input port and the output port are the same port.

7. The converter of claim 2 wherein
the data signal input port and the output port are each coupled to both a first end and second end of one of the non-linear elements; and
wherein one of the at least two optical paths is from the data signal input port to the first end of the non-linear element to the second end of the non-linear element to the output port and another of the at least two optical paths is from the data signal input port to the second end of the non-linear element to the first end of the non-linear element to the output port.

8. The converter of claim 2 wherein
a first and second of the one or more non-linear elements are reflecting non-linear elements; and
the data signal input port, the first non-linear element and the output port form one of the at least two optical paths and the data signal input port, the second non-linear element, and the output port form another of the at least two optical paths; and
the output port and the control signal input port are ports of one coupler.

9. The converter of claim 1 further comprising an amplifier connected to the control signal input port.

10. The converter of claim 1 further comprising a filter connected to the output port that filters out control signals.

11. The converter of claim 1 wherein the TOAD is a Sagnac-loop TOAD.

12. The converter of claim 1 wherein the TOAD is a Mach-Zehnder TOAD.

13. The converter of claim 1 wherein the data signal input port, the output port and two non-linear elements form a Michelson TOAD.

14. The converter of claim 1 wherein the continuous optical signal source is a continuous wave laser.

15. The converter of claim 1 wherein the continuous optical signal source produces a continuous sequence of light pulses having a pulse width greater than a sampling window of the TOAD.

16. The converter of claim 1 wherein the wavelength of the continuous optical signal source is different from the wavelength of the input data signal, resulting in an output data signal having a different wavelength than the input data signal.

17. The converter of claim 16 wherein the predetermined width of the output data signal is approximately the same as the width of the input data signal.

18. A method of converting the format of optical data comprising the steps of:
supplying a continuous optical signal to the data signal input port of a TOAD; and
supplying a data signal to the control signal input port of a TOAD,
wherein an output data signal produced by the TOAD has a predetermined width based on a sampling window of the TOAD.

19. The method of claim 18 further comprising the step of using a tunable delay line located in one of at least two optical paths within the TOAD to adjust a width of an output signal produced by the TOAD.

20. The method of claim 18 wherein the wavelength of the continuous optical signal source is different from the wavelength of the input data signal, resulting in an output data signal having a different wavelength than the input data signal.

21. The method of claim 20 wherein the predetermined width of the output data signal is approximately the same as the width of the input data signal.

22. An optical data format converter comprising:
a TOAD having
a data signal input port,
a control signal input port,
one or more non-linear elements each having a first state in which light passing through it is substantially unchanged and a second state in which a characteristic of the light passing through it is changed, and an output port, and
a pulsed optical signal source supplying a pulsed optical signal to the control signal input port where the pulses are aligned for sampling near the center of each bit in a non-return-to-zero data signal applied to the data input port,
whereby an output data signal is produced on the output port having a predetermined pulse width.

23. The converter of claim 22 wherein the data input port, the control input port and the output port are coupled to at least one of the one or more non-linear elements such that
at least two optical paths are formed from the data input port to the output port each including a non-linear element, a control signal input at the control input port causes the non-linear element in each path to change from its first state to its second state, and an optical data signal input to the data input port will produce an output data signal on the output port if an associated control signal is input to the control port and will otherwise produce substantially no output data signal on the output port, and wherein, the output data signal has a predetermined width based on the period of time that light from the two optical paths arrives at the output port having passed through different non-linear element states.

24. The converter of claim 23 further comprising:

a tunable delay line located in one of the first and second optical paths that adjusts the width of the data output signal.

25. The converter of claim 23 wherein the data signal input port, the output port and one of the non-linear elements form an optical loop.

26. The converter of claim 23 wherein the data signal input port, a first non-linear element, and the output port form one of the at least two optical paths and the data signal input port, a second non-linear element, and the output port form another of the at least two optical paths.

27. The converter of claim 26 wherein the control signal input port and the output port are the same port.

28. The converter of claim 23 wherein the data signal input port and the output port are each coupled to both a first end and second end of one of the non-linear elements; and wherein one of the at least two optical paths is from the data signal input port to the first end of the non-linear element to the second end of the non-linear element to the output port and another of the at least two optical paths is from the data signal input port to the second end of the non-linear element to the first end of the non-linear element to the output port.

29. The converter of claim 23 wherein a first and second of the one or more non-linear elements are reflecting non-linear elements; and the data signal input port, the first non-linear element and the output port form one of the at least two optical paths and the data signal input port, the second non-linear element, and the output port form another of the at least two optical paths; and the output port and the control signal input port are ports of one coupler.

30. The converter of claim 22 wherein the pulses are aligned by placing the center of each pulse in a period excluding [T–τ,T+τ], where T is the boundary of a bit period of the non-return-to-zero data signal, and τ is the greater of the width of the output data signal and a rise and fall time of the non-return-to-zero data signal.

31. The converter of claim 22 further comprising an amplifier connected to the control port.

32. The converter of claim 22 further comprising a filter connected to the output port that filters out control signals.

33. The converter of claim 22 wherein the TOAD is a Sagnac-loop TOAD.

34. The converter of claim 22 wherein the TOAD is a Mach-Zehnder TOAD.

35. The converter of claim 22 wherein the data signal input port, the output port and two non-linear elements form a Michelson TOAD.

36. A method of converting the format of optical data comprising the steps of:

supplying a non-return-to-zero optical data signal to the data signal input port of a TOAD; and supplying a pulsed optical signal to the control signal input port of a TOAD where the pulses are aligned for sampling near the center of each bit in the non-return-to-zero data signal applied to the data input port.

37. The method of claim 16 further comprising the step of using a tunable delay line located in one of at least two optical paths within the TOAD to adjust a width of an output signal produced by the TOAD.

* * * * *

UNITED STATES PATENT AND TRADEMARK OFFICE
CERTIFICATE OF CORRECTION

PATENT NO.   : 6,448,913 B1
DATED        : September 10, 2002
INVENTOR(S)  : Prucnal et al.

It is certified that error appears in the above-identified patent and that said Letters Patent is hereby corrected as shown below:

Column 10,
Line 37, replace the numeral "16" with -- 36 --:

Signed and Sealed this

Twenty-fifth Day of March, 2003

JAMES E. ROGAN
*Director of the United States Patent and Trademark Office*